Oct. 10, 1961 W. J. THOMAS 3,003,643
FILTER MEDIA
Filed Oct. 28, 1957
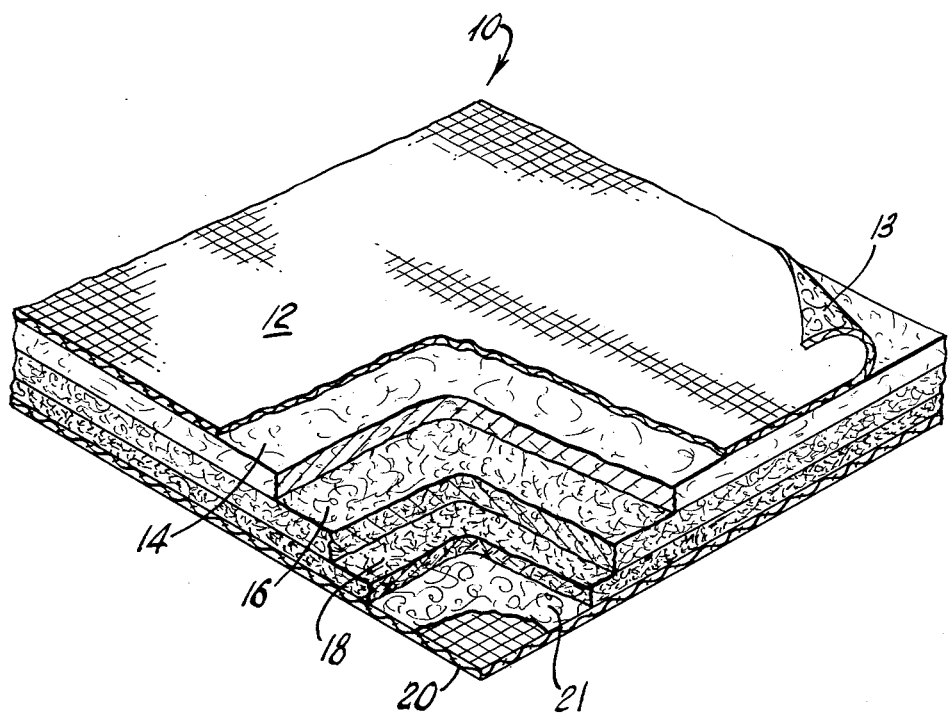
INVENTOR
WILLIAM J. THOMAS
BY
Alexander T. Kardos.
ATTORNEY 3,003,643
FILTER MEDIA
William J. Thomas, Arlington, Va., assignor to Johnson
 & Johnson, a corporation of New Jersey
Filed Oct. 28, 1957, Ser. No. 692,802
4 Claims. (Cl. 210—491)

The present invention relates to a new and improved filter media for separating finely divided solids and semi-solids from fluids. More particularly, the present invention is concerned with a cellulosic filter media for use in the filtering of viscous solutions of high polymeric materials, preparatory to the conversion of such solutions into filaments, films, and like shaped products and materials by spinning, extrusion, casting or like processes. Examples of such materials are cellophane; viscose and cuprammonium rayon; cellulose esters such as cellulose acetate and triacetate; acrylic fibers such as "Acrilan" and "Creslan"; "Darlan"; dinitrile fibers; proteinaceous fibers such as "Vicara" zein, etc.

In the following specification, the invention will be described with particular reference to viscose solutions used for spinning rayon filaments but such is the case merely to illustrate the invention and is not to be construed as limitative of the broader aspects thereof which are applicable to other viscose solutions, as noted above and hereinafter.

In spinning such rayon filaments, it is essential that the spinning solution be substantially free of solid and semi-solid particles and that it be substantially completely homogeneous and have uniform consistency. Were it otherwise, the orifices in the spinneret through which the filaments are extruded and formed would quickly become partially or completely blocked to disrupt operations, or, at best, to provide barely operational conditions yielding defective, non-uniform and unsatisfactory filaments. Additionally, even if such solid and semi-solid particles manage to get through the spinneret, their presence in the final product exerts an undesirable weakening effect. This, of course, is particularly true for low denier filaments and particularly those having a width of from about 3 microns to about 75 microns and thin cellophane sheets and films and particularly those having a thickness range of from about .0005 inch to about .01 inch.

The solutions intended for spinning purposes usually visibly appear to be completely homogeneous and apparently do not require any filtering processes. Actually, however, these solutions are not completely homogeneous and, for example, contain highly swollen gelatinous materials which may vary in size from about one micron or less in diameter up to perhaps about several hundred microns or more in diameter. These gels or jelly-like materials, and particularly the particles having larger diameters, are capable of lodging in and constricting or completely blocking the spinneret orifices or of passing therethrough to undesirably affect the spun filament. It is obvious, of course, that such materials must be removed before the spinning of the filaments.

In the usual viscose rayon manufacturing procedure, the viscose solution is forced by pressure means through a series of one, two or more filtering devices, such as plate-and-frame filter presses. These filtering devices are intended to remove dirt, rust, mineral matter and other foreign solid and semi-solid particles, including incompletely dissolved cellulosic particles and the gelatinous materials referred to previously.

Many filter media have been devised in the past to separate out and remove such solid and semi-solid particles and many of them have been found moderately successful. Many of these filter media contain such materials as layers of carded cotton webs, cotton batting, felted cotton linters, comminuted wood or cotton linter pulp, woven fabrics, or the like. In many cases, these cellulosic layers are wrapped within layers of loosely woven cotton gauze, similar to surgeon's gauze, and are held together by stitching at the edges thereof, or by clipping or stapling the layers together at their edges and/or corners to prevent separation of the layers during handling, or when in use.

Unfortunately, the extremely wide range in the size and type of the materials to be removed from the viscose solution has created a problem during such filtrations and has often resulted in the partial or even complete blockage and plugging of the customarily-used filter media. This naturally, has undesirably slowed down and often completely stopped the filtering process, resulting in drastically reduced capacities.

Additionally, in many cases, even though these filter media are relatively successful in filtering out and removing a considerable part of the undesirable solid and semi-solid particles, they themselves introduce an undesirable factor, namely, the possibility of the individual fibers of the filter media breaking loose, contaminating the filter press, and being carried into the filtrate. This filtrate, when used as a spinning solution, creates difficulties in the spinning operation in that the loose fibers can also enter and block the spinneret orifices.

It is therefore a principal purpose of the present invention to provide a specially constructed filter media of increased capacity for satisfactory use in the filtration of solutions of high polymeric materials preparatory to the spinning of said solutions into filaments.

It has been found that such a purpose may be accomplished by providing a filter medium comprising: (1) an incoming fibrous layer capable of separating out the very largest particles present in the viscous solution of high polymeric material; (2) a combination of a plurality of additional filtering layers, each capable of successively removing particles of a successively decreasing size; and (3) an outgoing fibrous layer capable of providing strength and support to the other layers and of preventing the passage of loose fibers which break free of or are loosened from the preceding layers.

The figure shows an isometric view of the filter medium 10 of the invention.

The incoming fibrous layer 12 may comprise a fabricated sheet-like material having a maximum pore diameter of from about 175 to about 300 microns and a layer weight of from about 350 to about 1350 grains per square yard. Within the more commercial ranges, however, the maximum pore diameter is preferably from about 180 to about 250 microns and a layer weight of from about 560 to about 1140 grains per square yard. The exact nature and construction of the incoming layer is not an essential feature of the invention and selection may be made from a wide variety of sheet-like materials having the desired pore diameter and weight. For example, the incoming layer may comprise gauze having fibrous materials 13 hereto, preferably only on the inner face. The gauze may be selected from any standard size and may be as low as 14 x 10, or 12 x 12, or as high as 20 x 12, or 18 x 14.

The nature of the fibrous materials bonded to the gauze may be selected from a wide range of fibers, natural, synthetic, and man-made, but are preferably natural and cellulosic in origin, such as cotton. The fibers are deposited on the gauze in a sufficient amount so as to create the desired layer weight and pore diameter. The amount of the deposited fibers will depend upon the nature and fineness of the deposited fibers, the nature, properties, and characteristics of the gauze layer, the purposes and intended uses of the resulting product, etc. It has been found that a fiber deposition of from about 200 grains per square yard to about 1100 grains per square yard and preferably from about 400 to about 875 grains per square yard will create the desired pore diameters and layer weight.

The fiber fineness of the fibrous materials deposited on the gauze fabric is in the range of from about 5.5 to about 7.5 micrograms per linear inch and preferably from about 6 to about 7.5 micrograms per linear inch.

The incoming fibrous layer does not compress very much under the pressures used in actual filtration and is primarily for the purpose of providing strength and support to the package dressing and for filtering out the largest of the solid and semi-solid particles.

Following the incoming layer is a combination of at least a second and a third and usually a fourth filtering layer of fibers having a fiber length of from about 1 mm. to about 5 cm. The properties and characteristics of the individual layers are so adjusted that each in turn separates out progressively smaller particles.

The second filtering layer 14 of the combination comprises fibers having an average fineness equivalent to a weight of from about 5.5 to about 7.5 micrograms per linear inch for a material having the density of cellulose (Micronaire Method). Within the more commercial ranges of the present invention, it has been found that an average fineness of from about 5.7 to about 7 micrograms per linear inch provides the most advantageous properties.

The maximum pore diameter of this second layer ranges from about 71 to about 160 microns and preferably from about 80 to about 140 microns. The weight of the second filtering layer ranges from about 875 to about 3500 grains per square yard and preferably from about 1300 to about 2500 grains per square yard. This combination of maximum pore diameter, weight and fiber fineness values cooperates to enable the second filtering layer to carry out its major function of separating out the large particles which have not been separated out by the incoming fibrous layer, while permitting the smaller particles to pass therethrough.

The third filtering layer 16 is made of finer fibers than the second filtering layer and has an average fiber fineness of from about 3 to about 5.4 micrograms per linear inch for a material having the density of cellulose and preferably from about 3.4 to about 5.0 micrograms per linear inch. The third filtering layer has a lower maximum pore diameter than the second filtering layer and is in the range of from about 48 to about 95 microns, and preferably from about 52 to about 75 microns. The weight of the third filtering layer is in the range of from about 875 to about 3500 grains per square yard and preferably from about 1300 to about 2500 grains per square yard. Again, this combination of maximum pore diameter, weight and fiber fineness cooperates to filter out the particles passed by preceding filtering layers and to let pass the smaller particles.

The second and third filtering layers are preferably through-bonded with from about 1½% to about 20% by weight of a bonding agent. These layers may be individually through-bonded and merely placed adjacent each other in the first product, or they may be through-bonded together into one composite through-bonded layer and used as such. The particular type of binder is not an essential feature of the present invention and the selection of a specific binder may be made from a wide range of well-known possible materials suitable for the desired purpose. One example of a binder which has been found to be especially adaptable for the purpose of the present invention is high viscosity polyvinyl alcohol which may be classified as a hot water-soluble and cold water-insoluble binder. Other binders such as latices of rubber, vinyl resins such as "geon," acrylates such as ethyl acrylate polymers and copolymers, etc., are also applicable.

The materials to be through-bonded are immersed in a warm aqueous solution (about 30° to about 70° C.) containing about 1.5% by weight of polyvinyl alcohol binder. The materials are then passed through a pair of adjustable squeeze rolls so that the resulting squeezed material contains approximately 250% of the aqueous solution based on the dry weight of the web. The materials are then dried, preferably in heated air at a temperature of from about 250° to about 350° F. for a time of from about 2 to about 5 minutes. The finished material in such a case contains about 3.8% by weight of the bonding agent which is deposited substantially uniformly throughout the thickness of the layers.

The fourth filtering layer 18 contains fibers which form a layer which is denser than the preceding two layers and has a density in the range of from about 230 to about 290 grains per cubic inch. This fourth layer has a lower maximum pore diameter than the preceding layers and is in the range of from about 45 to about 60 microns and preferably from about 50 to about 58 microns. This layer may advantageously be treated with a wet strength chemical, such as a melamine-formaldehyde resin or a urea-formaldehyde resin, to provide any desired wet strength.

The fourth layer filters out the extremely small particles which are not separated out by the preceding filtering layers. This separation is the finest of all the filtrations accomplished by the filter media of the present invention.

One typical material suitable for use as a fourth filtering is a layer of wet-formed cotton linter pulp having a weight of from about 4000 to about 5300 grains per square yard and preferably from about 4600 to about 5000 grains per square yard. This weight and density cooperate in the wet forming process to yield the desired maximum pore diameter and filtering characteristics.

An outgoing fibrous layer 20 is provided and may comprise a fabricated sheet-like material having a maximum pore diameter of from about 57 to about 150 microns, and preferably from about 65 to about 130 microns.

The weight of such a layer is in the range of from about 900 to about 2020 grains per square yard and preferably from about 1100 to about 1500 grains per square yard. The exact nature and construction of the outgoing layer is not an essential feature of the invention and may be selected from a wide variety of sheet-like materials having the desired pore diameters and weights. For example, the outgoing layer may comprise gauze having fibrous materials 21 bonded thereto, preferably only on the inner face. The gauze may be selected from any standard size and may be as low as 14 x 10 or 12 x 12, or as high as 20 x 12 or 18 x 14.

The nature of the fibers bonded to the gauze face may be selected from a wide range of fibrous materials such as previously described but are preferably natural and cellulosic in origin. The resulting product may be very similar to the incoming fibrous layer. The deposited fiber weight is in the range of from about 400 to about 1800 grains per square yard but preferably is from about 850 to about 1250 grains per square yard. The fiber fineness is in the range of from about 3 to about 7.5 micrograms per linear inch.

The purpose of the outgoing gauze layer is to provide strength to the package dressing and to prevent any of the smaller fibers of the preceding layers which break loose from being carried into the filtrate.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

A filter media is prepared according to the following specifications. The incoming layer (1125 grains per square yard) is formed of 20 x 12 gauze upon which is deposited and bonded thereto approximately 875 grains per square yard of fibers having a fiber fineness of about 6 micrograms per linear inch. The maximum pore diameter is about 190 microns. The second filtering layer comprises fibers having a fineness of about 6 micrograms per linear inch. The second layer has a weight of 1750 grains per square yard and a maximum pore diameter of 89 microns, determined as described herein. The third layer comprises fibers having a fineness of about 3.5 micrograms per linear inch. The third layer has a weight of 1800 grains per square yard and a maximum pore diameter of 65 microns. The second and third layers are through-bonded separately with about 5% by weight of polyvinyl alcohol. The fourth layer comprises wet-formed cotton linter pulp which has been treated with a melamine-formaldehyde resin to create enhanced wet strength. The weight of the cotton linter pulp layer is about 4800 grains per square yard and the maximum pore diameter is about 56. The outgoing fibrous layer (1125 grains per square yard) is formed of 20 x 12 gauze upon which is deposited and bonded thereto approximately 875 grains per square yard of fibers having a fineness in the range of about 4 micrograms per linear inch. The maximum pore diameter is about 85 microns.

This filter media is used in the filtration of a viscose solution preparatory to its being spun to filaments. The filtration proceeds relatively rapidly with very little blocking and plugging of the pore of the filter media. The capacity of the filter media is excellent and the product is commercially acceptable.

*Example II*

A filter media is prepared in a similar fashion to that set forth in Example I with the exception that the second filtering layer is omitted. Use of the resulting filter media is not wholly satisfactory due to blocking and plugging of the pore of the filtering layers, notably the layer which was originally the third filtering layer in Example I but which is now the second filtering layer in the instant filter media. The capacity of the filter media is reduced and the product is not wholly commerically acceptable.

The pore diameter measurements referred to herein are determined under a pressure of 30 p.s.i.g. by the standard tests set forth in the Journal of the Textile Institute, May 1954, on pages T371 through T389.

Although several specific examples of the inventive concept have been described, the same should not be construed as limited thereby nor to the specific substances mentioned therein but to include various other compounds of equivalent constitution as set forth in the claims appended hereto. It is understood that any suitable changes, modifications and variations may be made without departing from the spirit and scope of the invention.

I claim:

1. Filter medium for use in the filtration of solutions of high polymeric materials preparatory to the conversion of said solutions into filaments, films and the like comprising an incoming fibrous layer having a maximum pore diameter of from about 175 to about 300 microns; a combination of at least a second, third and fourth filtering layer of fibers; the fibers in said second layer having an average fineness equivalent to a weight of from about 5.5 to about 7.5 micrograms per linear inch for a material having the density of cellulose, said second layer having a maximum pore diameter of from about 71 to about 160 microns and a layer weight of from about 875 to about 3500 grains per square yard; the fibers in said third layer having an average fineness in the range of from about 3 to about 5.4 micrograms per linear inch for a material having the density of cellulose, said third layer having a maximum pore diameter in the range of from about 48 to about 95 microns and a layer weight in the range of from about 875 to about 3500 grains per square yard; said second and third layers being through-bonded with from about 1½% to about 20% by weight of a bonding agent; the fibers in said fourth layer forming a denser layer than the second layer than the second and third layers, said fourth layer having a maximum pore diameter in the range of from about 45 to about 60 microns and a layer weight of from about 4000 to about 5300 grains per square yard; and an outgoing fibrous layer having maximum pore diameters greater than the pore diameters of said fourth layer.

2. Filter medium for use in the filtration of solutions of high polymeric materials preparatory to the conversion of said solutions into filaments, films and the like comprising an incoming fibrous layer having a maximum pore diameter of from about 175 to about 300 microns; a combination of at least a second, third and fourth filtering layer of fibers having a fiber length of from about 1 mm. to about 5 cm.; the fibers in said second layer having an average fineness equivalent to a weight of from about 5.5 to about 7.5 micrograms per linear inch for a material having the density of cellulose, said second layer having a maximum pore diameter of from about 71 to about 160 microns and a layer weight of from about 875 to about 3500 grains per square yard; the fibers in said third layer being finer on an average basis than the fibers in the second layer and in the range of from about 3 to about 5.4 micrograms per linear inch for a material having the density of cellulose, said third layer having a maximum pore diameter lower than the pore diameter of the second layer and in the range of from about 48 to about 95 microns and a layer weight in the range of from about 875 to about 3500 grains per square yard; said second and third layers being through-bonded with from about 1½% to about 20% by weight of a bonding agent; the fibers in said fourth layer forming a denser layer than the second and third layers, said fourth layer having a maximum pore diameter lower than the pore diameter of the second and third layers and in the range of from about 45 to about 60 microns and a layer weight of from about 4000 to about 5300 grains per square yard; and an outgoing fibrous layer having a maximum pore diameter of from about 57 to about 150 microns.

3. Filter medium for use in the filtration of solutions of high polymeric materials preparatory to the conversion of said solutions into filaments, films and the like comprising an incoming fibrous layer having a maximum pore diameter of from about 175 to about 300 microns; a combination of at least a second and third filtering layer of fibers; the fibers in said second layer having an average fineness equivalent to a weight of from about 5.5 to about 7.5 micrograms per linear inch for a material having the density of cellulose, said second layer having a maximum pore diameter of from about 71 to about 160 microns and a layer weight of from about 875 to about 3500 grains per square yard; the fibers in said third layer having an average fineness in the range of from about 3 to about 5.4 micrograms per linear inch for a material having the density of cellulose, said third layer having a maximum pore diameter in the range of from about 48 to about 95 microns and a layer weight in the range of from about 875 to about 3500 grains per square yard; said second and third layers being through-bonded with from about 1½% to about 20% by weight of a bonding agent; and an outgoing fibrous layer having maximum pore diameters greater than the maximum pore diameter of said third layer.

4. Filter medium for use in the filtration of solutions of high polymeric materials preparatory to the conversion of said solutions into filaments, films and the like comprising an incoming fibrous layer having a maximum pore diameter of from about 175 to about 300 microns; a combination of at least a second and third filtering layer of fibers having a fiber length of from about 1 mm. to about 5 cm.; the fibers in said second layer having an average fineness equivalent to a weight of from about 5.5 to about 7.5 micrograms per linear inch for a material having the density of cellulose and a maximum pore diameter of from about 71 to about 160 microns and a weight of from about 875 to about 3500 grains per square yard; the fibers in said third layer being finer on an average basis than the fibers in the second layer and in the range of from about 3 to about 5.4 micrograms per linear inch for a material having the density of cellulose, and a maximum pore diameter lower than the pore diameter of the second layer and in the range of from about 48 to about 95 microns and a weight in the range of from about 875 to about 3500 grains per square yard; said second and third layers being through-bonded with from about 1½% to about 20% by weight of a bonding agent; and an outgoing fibrous layer having a maximum pore diameter of from about 57 to about 150 microns.

References Cited in the file of this patent

UNITED STATES PATENTS

| | | |
|---|---|---|
| 2,101,811 | Franzmier | Dec. 7, 1937 |
| 2,266,638 | Hull et al. | Dec. 16, 1941 |
| 2,349,469 | Sloan | May 23, 1944 |
| 2,589,870 | Sale et al. | Mar. 18, 1952 |
| 2,607,954 | Schneider et al. | Aug. 26, 1952 |
| 2,675,127 | Layte | Apr. 13, 1954 |
| 2,742,951 | Marc | Apr. 24, 1956 |
| 2,834,730 | Painter et al. | May 13, 1958 |
| 2,869,176 | Wright | Jan. 20, 1959 |

UNITED STATES PATENT OFFICE
CERTIFICATE OF CORRECTION

Patent No. 3,003,643                 October 10, 1961

William J. Thomas

It is hereby certified that error appears in the above numbered patent requiring correction and that the said Letters Patent should read as corrected below.

Column 2, lines 56 and 57, for "13 hereto" read -- 13 bonded thereto --; column 4, line 31, for "equare" read -- square --; column 8, line 5, for "2,266,638" read -- 2,266,368 --.

Signed and sealed this 27th day of March 1962

(SEAL)
Attest:

ERNEST W. SWIDER                 DAVID L. LADD
Attesting Officer                 Commissioner of Patents